United States Patent [19]
Dalton et al.

[11] Patent Number: 5,846,577
[45] Date of Patent: Dec. 8, 1998

[54] CONTINUOUS WEB PRESS WITH A POLYTETRAFLUOROETHYLENE COMPOSITE

[76] Inventors: Robert E. Dalton, 435 Cherry Brook Rd., Canton Center, Conn. 06020; Myron A. Rudner, 58 Rock Hill Rd., Woodbridge, Conn. 06525

[21] Appl. No.: 842,844

[22] Filed: Apr. 17, 1997

Related U.S. Application Data

[62] Division of Ser. No. 349,392, Dec. 5, 1994, Pat. No. 5,670,189, which is a division of Ser. No. 79,163, Jun. 18, 1993, Pat. No. 5,399,307.

[51] Int. Cl.⁶ .................................................. B29C 39/16
[52] U.S. Cl. .......................... 425/327; 264/166; 264/167; 264/175; 264/310; 425/335; 425/371; 425/DIG. 55
[58] Field of Search ..................... 425/335, 363, 425/371, 372, 327, DIG. 55; 264/166, 167, 175, 310; 524/462

[56] References Cited

U.S. PATENT DOCUMENTS

| | | |
|---|---|---|
| 2,728,698 | 12/1955 | Rudner . |
| 3,501,360 | 3/1970 | Mancel . |
| 3,629,383 | 12/1971 | Kometani et al. . |
| 3,985,489 | 10/1976 | de Mets . |
| 3,995,399 | 12/1976 | Weiner et al. . |
| 4,043,733 | 8/1977 | De Mets . |
| 4,102,966 | 7/1978 | Duperray et al. . |
| 4,147,824 | 4/1979 | Dettmann et al. . |
| 4,177,320 | 12/1979 | Yoshimura et al. . |
| 4,267,237 | 5/1981 | Duperray et al. . |
| 4,293,509 | 10/1981 | Bucking . |
| 4,309,474 | 1/1982 | Hodes et al. . |
| 4,311,550 | 1/1982 | Kerttula . |
| 4,350,484 | 9/1982 | Seeger et al. . |
| 4,408,007 | 10/1983 | Kuhls et al. . |
| 4,420,299 | 12/1983 | De Mets . |
| 4,420,357 | 12/1983 | Neubauer et al. . |
| 4,546,572 | 10/1985 | Fischer . |
| 4,565,509 | 1/1986 | De Mets . |
| 4,569,155 | 2/1986 | Fischer et al. . |
| 4,573,899 | 3/1986 | Weimann et al. . |

(List continued on next page.)

FOREIGN PATENT DOCUMENTS

| | | |
|---|---|---|
| 1584519 | 12/1969 | France . |
| 2756630 | 6/1978 | Germany . |
| 46-29635 | 8/1971 | Japan . |
| 52-72765 | 6/1977 | Japan . |
| 54-61262 | 5/1979 | Japan . |
| 7208704 | 12/1972 | Netherlands . |
| 553115 | 1/1976 | U.S.S.R. . |
| 708049 | 4/1954 | United Kingdom . |

OTHER PUBLICATIONS

"Selecting the Right 'Telflon' TFE Compound for Best Performance", *J. of Teflon*, 1972, 13(2).

*Primary Examiner*—Patrick Ryan
*Assistant Examiner*—Joseph Leyson
*Attorney, Agent, or Firm*—Woodcock Washburn Kurtz Mackiewicz & Norris, LLP

[57] ABSTRACT

A continuously operating press for pressing a web of material together has a press zone at an input side a calibration zone at an output side. This press may be used in the formation of particle board by applying heat and pressure to press the web of material together to form the particle board. Preferably, the press has a lower press platen and an upper press platen that are pressed together to form the particle board. Both the lower press platen and the upper press platen preferably have a PTFE composite pressure pad. This composite pressure pad may have a layer of virgin PTFE and a layer of filled PTFE. The layer of filled PTFE is preferably partially compressed at a pressure of about 14.7 psi. After which, the layer of filled PTFE is preferably compression molded with the layer of virgin PTFE to form a composite. This composite may also be sintered and coined.

19 Claims, 4 Drawing Sheets

U.S. PATENT DOCUMENTS

| | | |
|---|---|---|
| 4,615,933 | 10/1986 | Traut . |
| 4,666,787 | 5/1987 | Bickel et al. . |
| 4,692,493 | 9/1987 | Sulzbach et al. . |
| 4,770,927 | 9/1988 | Effenberger et al. . |
| 4,808,651 | 2/1989 | Blickle et al. . |
| 4,850,848 | 7/1989 | Greten et al. . |
| 4,900,629 | 2/1990 | Pitolaj . |
| 4,933,388 | 6/1990 | Blickle et al. . |
| 4,937,025 | 6/1990 | Foster et al. ............................ 264/120 |
| 4,961,891 | 10/1990 | Pitolaj . |
| 5,032,335 | 7/1991 | Wilson . |
| 5,055,539 | 10/1991 | Hengel et al. . |
| 5,064,593 | 11/1991 | Tamaru et al. . |
| 5,229,139 | 7/1993 | Haupt . |
| 5,244,618 | 9/1993 | Kemerer et al. ................. 425/DIG. 55 |
| 5,420,191 | 5/1995 | Howard, Jr. et al. ................... 524/462 |
| 5,458,477 | 10/1995 | Kemerer et al. . |
| 5,592,874 | 1/1997 | Blauhut . |
| 5,593,776 | 1/1997 | Ueno et al. . |

{# CONTINUOUS WEB PRESS WITH A POLYTETRAFLUOROETHYLENE COMPOSITE

This is a division of application Ser. No. 08/349,392, filed Dec. 5, 1994, now U.S. Pat. No. 5,670,189, which is a division of application Ser. No. 08/079,163, filed on Jun. 18, 1993, now U.S. Pat. No. 5,399,307, issued Mar. 21, 1995, the disclosure of which is herein incorporated by reference.

The present invention relates to compression molding two or more layers of powdered polytetrafluoroethylene (PTFE) resin and composite products made by such compression molding. More particularly, the present invention relates to forming composite articles by compression molding wherein the finished article exhibits two distinct layers or areas of material, preferably one of filled PTFE and one of virgin PTFE. The present invention also discloses the use of modified virgin PTFE resins to enhance the integrity of such composite structures.

BACKGROUND OF THE INVENTION

Polytetrafluoroethylene (PTFE) is a versatile and useful material. In the form of a powdered resin, PTFE can be molded in sheets and other shapes, or directly into a finished part or product. Several types of molding processes useful with PTFE have been developed. Compression molding involves placing a layer of PTFE resin under sufficient pressure to create a preform that can be sintered into a finished shape, which is usually then coined. Isostatic molding involves filling the void between a rigid molding surface and a flexible bladder with PTFE resin. The bladder is then pressurized, and squeezes the resin between the bladder and the molding surface. The bladder is then removed and the resin is sintered. Isostatic molding is expensive and cumbersome, but is well-suited for forming complex and intricate shapes such as valve linings. In fact, the body of the valve itself can be used as the molding surface, thus permitting the valve lining to be formed in situ without requiring secondary shaping or cutting operations. However, for many applications, compression molding remains the simplest and most economic method of producing PTFE articles.

Sheets, bars or other shapes of compression molded PTFE are used to create many useful articles that take advantage of its low coefficient of friction and chemically impervious nature. However, the structural characteristics of a shape formed from virgin PTFE are less than ideal for many situations. It is known, for example, that virgin PTFE exhibits a large degree of cold flow (i.e., "creep") when exposed to continuous loads at elevated temperatures. For example, at 500 psi and 73° F., virgin PTFE will cold flow from an initial deformation of 0.9% to about 1.8% in 10,000 hours. At 212° F., an initial deformation of 3.5% would increase to approximately 7% in the same time period. It is also known that PTFE exhibits deformation due to compressive stress. At stress levels of 500 psi and at a temperature 73° F., this strain is almost negligible, while at 300° F. the strain at this loading is about 5%. A similar strain level, 5%, is exhibited at 73° F. when the compressive stress is raised to about 1,900 psi. Thus, in applications, where the PTFE component is under a compressive load and/or exposed to elevated temperatures, cold flow and deformation due to compressive stress are important considerations.

Nevertheless, it is known that the problems of cold flow can in some instances be overcome by adding fillers to virgin PTFE resins. The use of filler materials is well known in the art of forming shapes from PTFE. See "Selecting the Right 'Teflon' TFE Compound For Best Performance," *Journal of "Teflon"* Volume 13, No. 2 (1972). Examples of filler materials include glass fibers, carbon, graphite, bronze and molybdenum disulfide ($MoS_2$). The modification of the performance of PTFE resins by the use of fillers affects certain mechanical properties and permits resin filler compositions to be tailored to the electrical and mechanical requirements of the application. In general, PTFE resins can be compounded with fillers to increase strength characteristics such as stiffness and resistance to cold flow, to increase thermal conductivity, and to increase hardness and resistance to wear. However, it is also known in the art that any filler raises the low coefficient of friction exhibited by parts formed from virgin PTFE resins and that the increases in hardness and resistance to wear result in an article that abrades or wears cooperating surfaces.

Modified PTFE resins are currently available that provide products exhibiting improved resistance to cold flow without sacrificing the low coefficient of friction of virgin PTFE. Additionally, products made from these modified resin have been found to exhibit better "weldability" to themselves and other PTFE products when used in compression molding. Examples of such modified PTFE resins are TFM1600 and TFM1700 sold by Hoechst, and TG70J and TG170J sold by duPont. One example of such a resin is disclosed in U.S. Pat. No. 4,408,007—Kuhls et al., which is incorporated herein by reference. In some instances the use of such resins is economically impractical since they cost between about 50% and 180% more than standard virgin PTFE.

Therefore, there remains a long felt, yet unsolved need to provide components formed from PTFE that retain the properties of virgin PTFE such as a low coefficient of friction on sliding surfaces, that also exhibit acceptable resistance to cold flow or have other improved properties usually provided by filled and/or modified resin, and that provide this combination of properties in an economically viable form.

Composite PTFE articles are known that are comprised of different types of PTFE. U.S. Pat. No. 5,032,335—Wilson discloses sealing elements sliced from a cylindrical billet comprised of two type of PTFE that are sintered together. The cylindrical billet is formed by arranging two separately formed, unsintered tubular billets concentrically within one another then adding pressure to the combined part and sintered the resulting composite billet. One of the unsintered tubular billets is comprised of filled PTFE while the other uses virgin resin. The separately formed, unsintered billets are compacted using a pressure between 250 to 2,500 psi. After assembly, an axial compressive pressure of between 2,000 to 25,000 psi is applied to fully compress unsintered billets into a preform, which is then sintered at 650° F. to 750° F. for two to 48 hours. A "sandwich" PTFE structure consisting of a layer of unfilled PTFE between two filled layers is disclosed in U.S. Pat. Nos. 4,961,891 and 4,900,629, both to Pitolaj. The disclosed composite structure is said to be highly compressible and is made by fusing sheets of PTFE together using calendar rolls. The resulting laminate is then sintered at 650° F. A multi-layer PTFE seal is also disclosed in U.S. Pat. No. 4,147,824—Dettmann et al. The disclosed seal comprises an outer layer and a porous layer made by washing a filler material from the PTFE. The first layer is fully compressed with a pressure of 300 bar (4,410 psi) and a second, filled layer is added and compressed with the same pressure. The resulting preform is then sintered and the filler material washed out, leaving a porous layer.

Isostatic molding can also be used to create composite structures from homogeneous preforms of different types of PTFE to achieve a unitary non-homogeneous structure, as shown in U.S. Pat. Nos. 4,267,237 and 4,102,966 both to Duperray et al. The preforms must be compressed by a pressure of at least 10 bar (147psi) since compression using lesser pressures will create preforms that are two brittle to be handled. The preforms are placed in an isostatic mold and further compressed to fuse them together or fuse them with a layer of powdered resin using isostatic pressures between 100 and 1,000 bar (1,470 and 14,700 psi).

However, it has been found that processes by which fully sintered sheets of two types of PTFE are laminated together are likely to delaminate, particularly under severe conditions of temperature and pressure. Conversely forming a preform from two layers of powdered resin that are simultaneously compressed will result in undesirable mixing and contamination of the separate "layers" of different types of PTFE.

Figure 1:
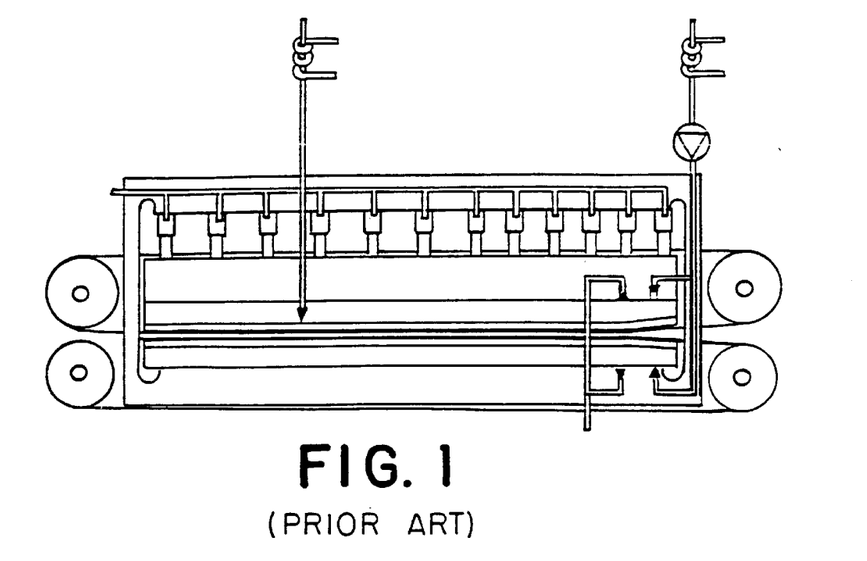
FIG. 1 is a side view of a prior art particleboard press that uses PTFE pressure pads as sliding surfaces urged against moving stainless steel belts.
Figure 2:
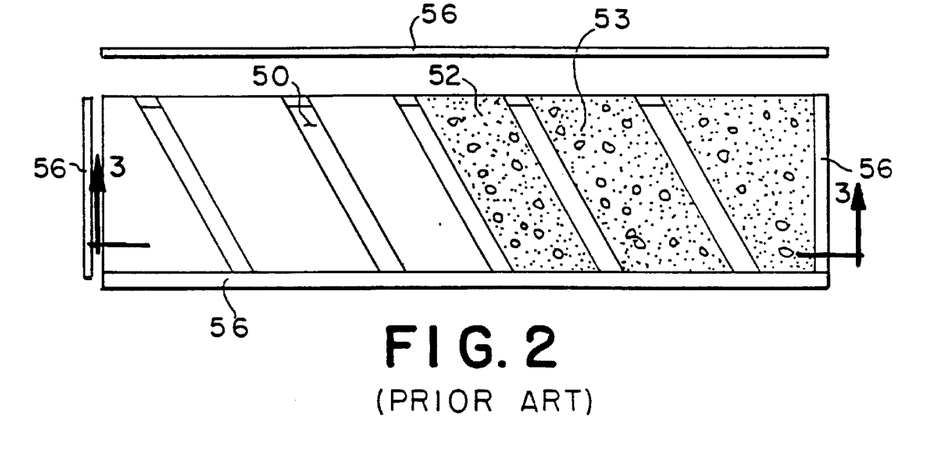
FIG. 2 is a top plan view of a carrier plate used in the apparatus shown in FIG. 1 showing the placement of the PTFE pressure plates.
Figure 3:
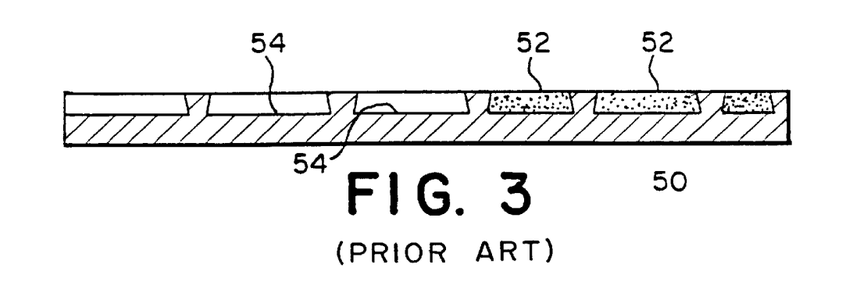
FIG. 3 is a cross-sectional view of the carrier plate of FIG. 2, taken along lines 3—3 as shown.

One example of an application where the current state of the art fails to provide an adequate material is for the pressure pads used to as sliding surfaces for the belts that compress sheets of particleboard as part of the manufacturing process performed by the Bison Hydrodyn press, manufactured by Bison Werke, Springe, Germany. The construction and operation of this press and similar types of manufacturing equipment is well known to those of ordinary skill and is shown, for example, in U.S. Pat. No. 4,850,848—Greten et al., which is incorporated herein by reference. As shown in FIG. 1, the Bison press and similar machines apply heat and pressure simultaneously to the components of the finished particleboard throughout the length of the machine. The heat is applied by hot lubricant on to the back side of stainless steel bands. The lubricant is pumped through PTFE pressure pads and provides a layer of lubricant between the pads and the bands, in addition to acting as a heat transfer medium. The PTFE pressure pads are attached to the platens that transfer vertical compression force provided by hydraulic cylinders. As seen in FIGS. 2–3, the pressure pads 52 have angled sides and are held in removable carrier trays 50 that form part of the press platens. The carrier trays 50 have angled slots 54 to retain the lateral edges of the PTFE pads 52 while retaining plates 56 are affixed to the perimeter of the carrier trays 50 to secure the pressure pads 52 in place. The lubricating fluid flows through passages 53 in the pads 52 and lubricates the bands.

In practice, it has been discovered that the pressure pads 52 in the above-described system fail in service by a mode referred to as "smearing." Smearing is the migration and thinning of the pressure pads without any wear, in other words, there is no appreciable weight difference between a new pad and a failed pad. Theoretically, the stainless steel belts ride on a layer of oil, the heating oil, that is pumped through the pads between the back surface of the stainless steel belts and the pads. Although the layer of oil is relied upon to prevent the pad from scraping and wearing against the stainless steel belts, in use, the hot oil system sometimes fails and the low friction coefficient of friction between the PTFE and the stainless steel belts is helpful. Moreover, the softer PTFE pads will wear before the stainless steel belts. For these reasons, PTFE is the preferred pressure pad material. However, because the operating temperature (360°–390° F.) and pressures (300–500 psi) are relatively high, the PTFE exhibits a significant degree of cold flow, ultimately leading to the "smeared" failure mode described above.

Therefore, in this type of equipment and many others, it would be desirable to provide a PTFE component such as the pressure pads that has an exposed sliding surface with a low coefficient of friction, yet resists cold flow at elevated temperatures and pressures. It be further desirable to provide such a component on an economically justifiable basis. It is therefore an object of the present invention to provide improved methods of compression molding PTFE resin into sheets, structural shapes or component parts. It is generally an object of the present invention to provide methods whereby filled and virgin PTFE resins may be compression molded into a unitary non-homogeneous composite structure exhibiting two or more distinct layers having different properties. It is a further object of the invention to permit filled and virgin PTFE resins to be molded together so that the virgin PTFE forms a sliding surface while the remainder of the material is comprised of a filled resin, wherein the filler is chosen to reduce cold flow. It is also an object of this invention to provide methods of manufacture and articles made thereby that make economic use of the various types and grades of PTFE resin, including modified PTFE.

SUMMARY OF THE INVENTION

It has now been found, however, that improved products and materials can be created by compression molding a preform from powdered PTFE resin by depositing a first layer comprising a first type of PTFE resin and partially compressing this first layer at a partial compression pressure less than about 500 psi. Next, a second layer preferably comprised of a second type of PTFE resin is deposited in the mold and the first and second layers are fully compressed with sufficient pressure to create a preform. In a preferred embodiment, the first layer is comprised of a filled PTFE resin and the second layer is comprised of virgin PTFE resin, most preferably a modified virgin resin that is resistant to cool flow. In accordance with the certain preferred embodiments of the present invention, the partial compression pressure is preferably less than 147.0 psi, more preferably less than 14.7 psi., and most preferably less than 0.4 psi. The methods of the present invention are useful for producing a variety of products, including sheets and cylinders. In addition to the two layer composite structures produced in one preferred embodiment, the methods disclosed herein may also be used to produce other composite structures. For example, the methods described above can also include the steps of adding one or more further layers of a PTFE resin and partially compressing the layers prior to the step of compressing the layer with the preform pressure.

Thus, the present invention disclosed articles of manufacture comprising a first layer of filled PTFE and a second layer of virgin PTFE, manufactured by the process of sintering and coining a preform comprised of the first and second layers, wherein the preform is manufactured in accordance with the above-described process. One particular preferred embodiment of such articles is a pressure pad for use in a particleboard manufacturing apparatus. In this embodiment, an article made in accordance with the present invention comprises a sliding surface of a layer of modified virgin PTFE and a second layer of filled, modified PTFE having significantly better resistance to cold flow than the virgin PTFE, such as modified PTFE with a carbon filler material.

In certain embodiments, the present invention provides a superior product by using modified virgin PTFE resins, which have been found to provide superior binding strength between layers. In any embodiment, however, the present invention uses conventional compression molding equipment.

DETAILED DESCRIPTION OF THE PREFERRED EMBODIMENTS

Figure 4:
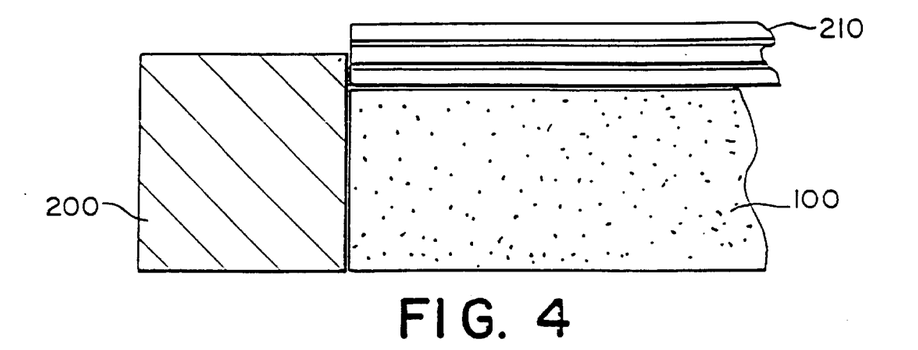
FIG. 4 is a side elevation view, in cross-section representing a portion of a compression molding process illustrating a mold containing filled resin.
Figure 5:
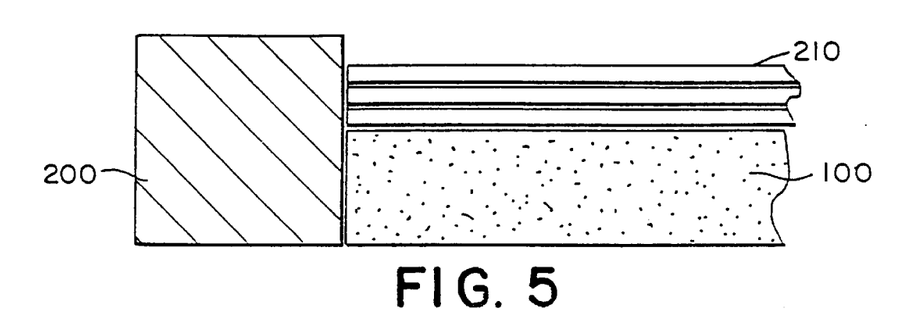
FIG. 5 is a view similar to FIG. 4 illustrating the partial compression of the filled resin.

The present invention provides methods whereby PTFE articles can be manufactured from two types of PTFE resin and as a result, exhibit distinct properties on different surfaces and/or improved overall properties. Referring to FIGS. 4–7, there is shown a broken away cross-sectional view of a compression mold 200 during the various steps that comprise the creation of a preform in accordance with the present invention. For purposes of illustration, portions of the compression mold apparatus such as the bottom pusher used to revise the resin in the mold are omitted. These and other elements of compression molding equipment will be well known to those of skill in the art. As seen in FIG. 4, a rigid lower section of the compression mold 200 is provided and is filled with a first type of PTFE resin 100. In a preferred embodiment, the first resin 100 will include a filler material, most preferably carbon. As known to those of ordinary skill in the art, a series of pushers 210 form part of the rigid compression mold assembly. As seen in FIG. 5, the relatively rigid pushers 210 are lowered against the first layer of PTFE resin 100 and partially compress this layer. As used herein, the term "partial compression" refers to a process whereby PTFE resin powder is compressed by a pressure of less than 34 bar (500 psi), the pressure being an average pressure determined by dividing the overall area of the pusher 210 contacting the surface of the resin by the magnitude of the force that urges the pusher 210 in compression. However, in certain preferred embodiments, it will be desirable to reduce the pressure during partial compression to less than 10 bar (147 psi), and in a most preferred embodiment, to less than 1 bar (14.7 psi). Certain useful embodiments, in fact, utilize pressures of less than 0.1 bar (1.5 psi)

Figure 6:
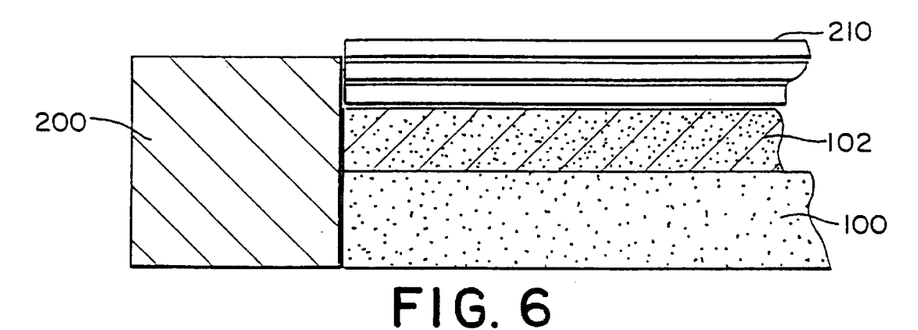
FIG. 6 is a view similar to FIG. 4 illustrating the addition of a layer of virgin resin.
Figure 7:
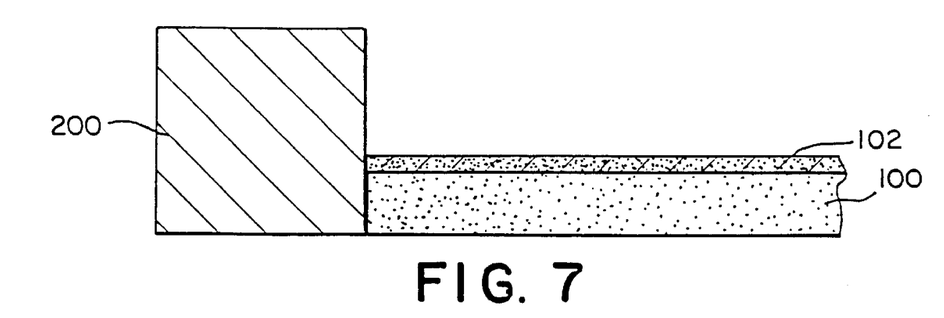
FIG. 7 is a view similar to FIG. 4 illustrating the full compression of the virgin and filled resin layers into a preform.

Referring now to FIG. 6, after the first layer of PTFE resin 10 has been partially compressed, a second layer of PTFE resin 102 is deposited within the mold. In a preferred embodiment, this layer is comprised of virgin PTFE and is most preferably a modified PTFE resin such as TFM1600 and TFM1700 sold by Hoechst, and TG 70J and TG 170J sold by dupont, reference above. The pusher bars or other form of rigid molding tool 210 are then used to fully compress both the first and second PTFE layers 100, 102. As used herein the term "fully compress" refers to the pressure normally applied to a particular powdered resin or resins to fully preform the powder prior to subsequent processing steps such as sintering and coining. The pressure applied to fully compress the composite structures formed with the present invention is normally between about 200 to 1,000 bar (2,940 to 14,700 psi). This procedure imparts a mechanically compressed effect to the preform. It should be realized that the properties of the preform will vary with both the partial compression and full compression pressures, as well as the comparable shrinkage rates and material grades for the PTFE resin.

It will be understood that the description set forth immediately above is meant to generally disclose and illustrate the methods of the present invention. An infinite number of variations are possible. For example, more than two layers and more than two types of PTFE resins may be used. Moreover, as also known in the art, compression molding may be used to create preforms of an infinite variety of shapes and sizes. In preferred embodiments, the present invention takes advantage of the characteristics of modified PTFE resins. It has been found that certain modified resins act as a binding agent between composite layers. In any embodiment, however, the present invention permits a preform to be created that contains at least two types of PTFE resin in two distinct layers and does so in a way that ensures a fully laminated structure while maintaining the integrity of the layers.

Although further variations and additional embodiments of the present invention will be set forth below, the general principles of the present invention are also further illustrated by the following specific examples.

EXAMPLE I

A compression molded sheet (approximately ⅝ inch thick, 48×48 inches) is formed by first pouring a layer of a filled modified resin (TFM 1700 and 20% carbon filler) into the compression mold and partially preforming this layer using a very low pressure of about 0.027 bar (0.4 psi). Next, a layer of virgin modified PTFE resin (TFM 1600) is added to the compression mold cavity and this layer and the first layer are fully compressed at a pressure of about 300–600 bar (4,410–8,820 psi). The resulting composite preform preferably has a layer of filled PTFE that is ½ inch thick, while the layer of virgin resin is about ⅛ inch thick. The fully compressed preform is then sintered at about 700° F. for about twenty-four hours, and coined in accordance with conventional practice.

Figure 8:
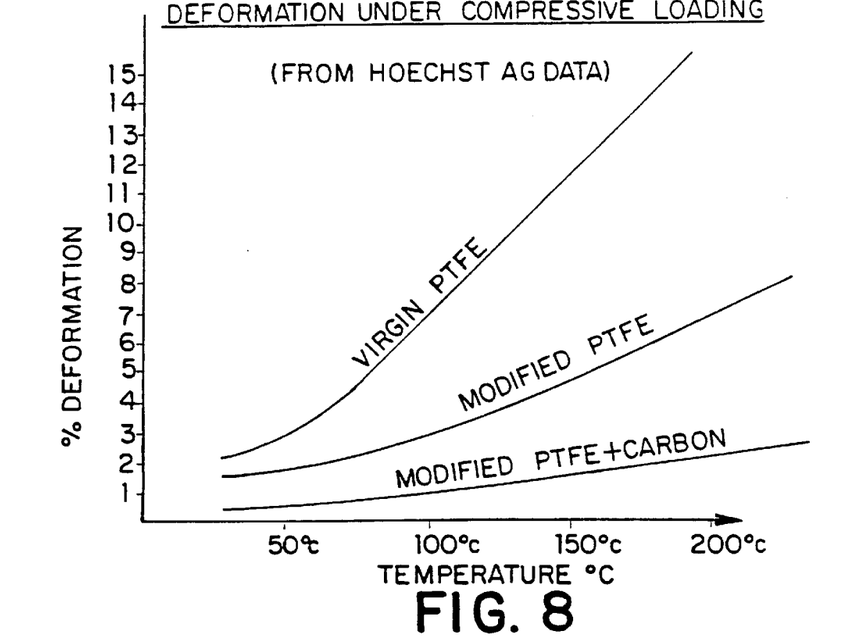
FIG. 8 is a graph of deformation v. temperature for PTFE resin used in preferred embodiments of this invention.

The resulting non-homogeneous composite sheet may then be cut or machined into components, such as the particleboard forming machinery pressure pads described above. In this application, the material formed in accordance with the present invention provides a layer of low friction, modified PTFE against which the stainless steel belts will slide, while also providing improved resistance to creep, and thus resistance to "smearing" by way of the layer of filled PTFE. Referring to FIG. 8, it can be seen that at the temperature range in which the particleboard machinery operates, a composite article made in accordance with the present invention exhibits markedly better resistance to deformation than virgin PTFE while retaining the desirable low coefficient of friction exhibited by virgin PTFE. Moreover, the cost of the overall sheet is considerably reduced, since the filler added to the modified virgin PTFE resin is only about b 10% of the cost of virgin unfilled PTFE.

Figure 9:
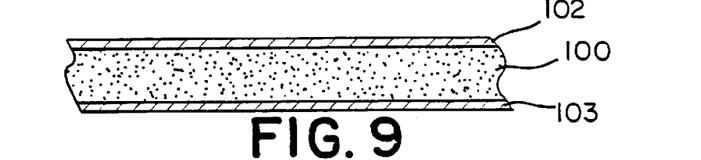
FIG. 9 depicts a composite structure made in accordance with the present invention wherein a layer of filled PTFE is disposed between two layers of virgin PTFE.

FIG. 9 depicts a composite structure made in accordance with the present invention wherein a layer of filled PTFE 100 is disposed between two layers of virgin PTFE 102, 103, in accordance with the methods discussed above. It will be appreciated that any combination of layers of filled and unfilled PTFE resins may be combined using the techniques disclosed herein. Those of ordinary skill will be able to select desired material properties and by designing a composite sheet having the appropriate proportions of different resins, the desired properties will be achieved.

Figure 10A:
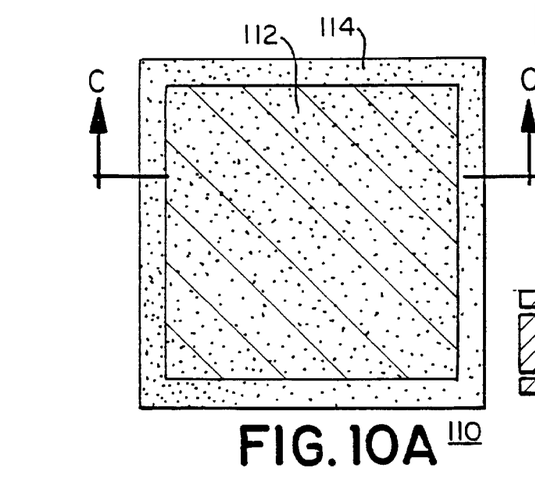
FIG. 10A depicts a composite sheet of filled and virgin PTFE resin.
Figure 10B:
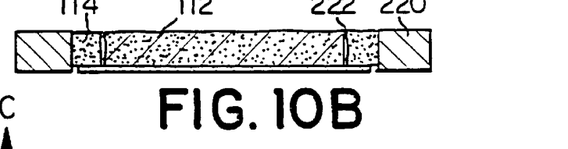
FIG. 10B illustrates the construction of the composite sheet shown in FIG. 10A.
Figure 10C:
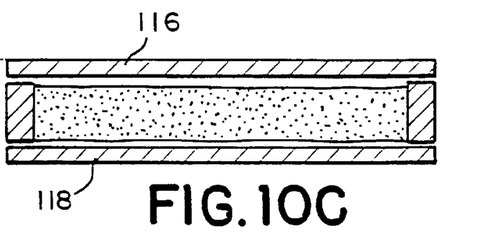
FIG. 10C shows a side elevation view of the composite sheet shown in FIG. 10A with additional layers of PTFE added in accordance with the present invention.

Other embodiments of the present invention are illustrated with reference to FIGS. 10A–10C. FIG. 10A depicts a composite sheet 110 comprising virgin PTFE sheet 112 with an area 114 of filled PTFE around its perimeter. This composite sheet 110 is formed by the process shown in FIG. 10B wherein a compression mold 220 contains the sheet 110 and a thin frame 222 separates the virgin sheet 112 and the filled area 114. The frame 222 is removed and the resins are compressed in the manner explained above, using a relatively low pressure. FIG. 10C illustrates a cross-section taken along line C—C in FIG. 10A. As also shown in FIG. 10C, additional layers of virgin PTFE 116, 118 are spread across the sheet 100 to cover the exposed surface. The resulting composite structure is then fully compressed into a preform and sintered. The resulting article is a sheet of PTFE that has a layer of virgin PTFE on all exposed sides (or only certain exposed sides in other embodiments) and an encapsulated "core" of less expensive filled PTFE that also exhibits properties that vary from virgin resin, such as improved resistance to cold flow. Embodiments made in accordance with this example are not necessarily rectangular, but may be any shape, for example, a circle of filled resin within a square frame of virgin resin. Moreover, in some instances, it will be desirable to cut, or otherwise machine the resulting composite sheet.

Figure 11:
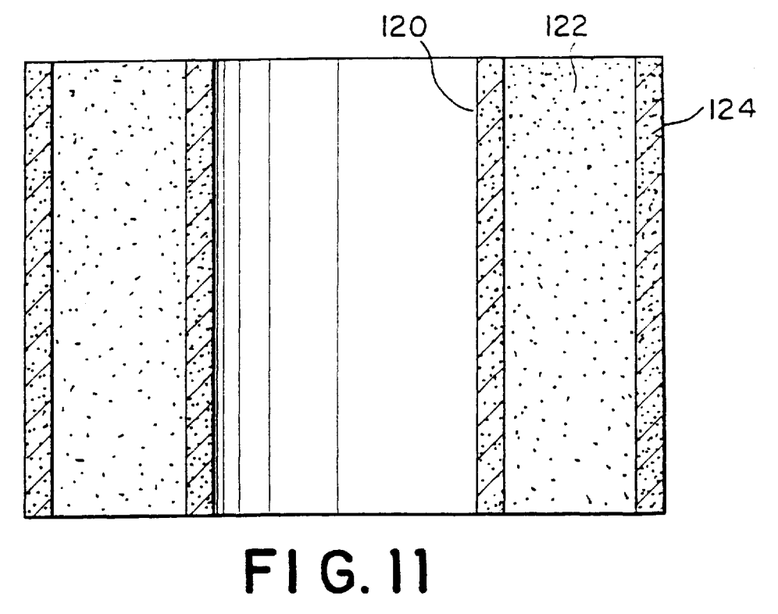
FIG. 11 is a side view, in cross-section of a cylindrical composite molded partial preform.
Figure 12:
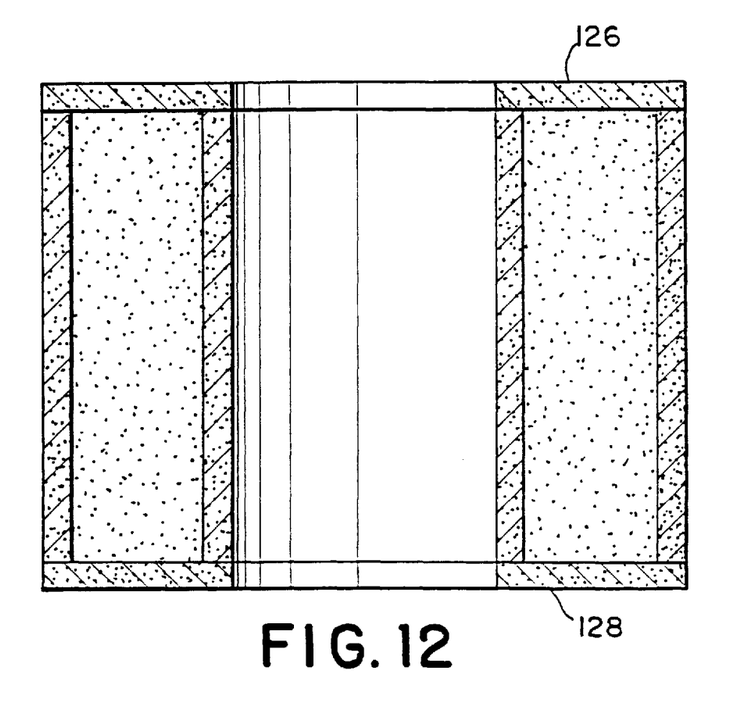
FIG. 12 illustrates the deposition of additional layers of virgin PTFE to create a finished preform.

The present invention can also be sued to create articles that are not solid. For example, FIG. 11 illustrates a side view, in cross-sectional of a cylindrical preform. The preform is preferably comprised of an inner layer of virgin PTFE 120, an intermediate layer of filled PTFE 122 and an outer layer of virgin PTFE 124. As explained above with reference to FIGS. 10A–10B this preform can be constructed using a cylindrical mold in conjunction with thin separators to permit the required layers of resin to be deposited. In accordance with the present invention, after the internal separators are removed, the preform shown in partially compressed using a relatively low pressure. After partial compression, additional layers of PTFE 126, 128, shown in FIG. 11, are disposed upon the cylindrical ends and the entire preform is fully compressed and sintered. It will be understood that although it is preferred that the outer surfaces of the resulting cylinder are comprised of virgin PTFE, any combination of resins may be used for the disclosed layers. It should be further noted that this embodiment, using a cylinder having a smaller height, permits a seal to be formed that has an outer layer of virgin PTFE covering all exterior surfaces while encapsulating a second type of PTFE that permits the seal to exhibit desired properties such as resilience or resistance to creep that would not be exhibited if the same seal were formed of virgin PTFE.

In certain embodiments, the present invention takes advantage of the improved properties of modified PTFE resins. However, it will be understood that the methods disclosed herein can be used with virtually any type of PTFE resin and any type of filler material to produce useful products in an economical manner. For example, in certain embodiments, the filled resin will be the most expensive component and layers or areas of virgin resin can be used where the properties of the filled resin are not needed. Finally, it will be understood that a benefit of the present invention is that the methods disclosed herein can be performed using conventional compression molding equipment, e.g., molds, presses, punches, ovens, etc. The only additional equipment needed in some embodiments is the thin flexible inserts that separate areas of different types of resin.

Although certain embodiments of the present invention have been set forth herein with a great degree of particularity, these embodiments are meant to illustrate the present invention and do not limit its scope. Upon review of this specification, numerous adaptations, modifications and variations based upon the principles disclosed herein will become apparent to those of ordinary skill in the art. Therefore, in order to determine the true scope of the present invention, reference should be made to the appended claims.

What is claimed is:

1. In a continuously operating press for pressing a web of material, the press having a press zone at an input side thereof and a calibration zone at an output side thereof and comprising:

a lower press platen with a surface and an upper press platen with a surface confronting said surface of said lower press platen;

means for adjusting the relative positions of said press platens and for urging them towards each other;

a first endless band guided around said lower platen;

a second endless band guided around said upper platen;

means for driving said first and second endless bands at the same speed throughout said press zone and said calibration zone; and an arrangement for building up and maintaining a film of lubricant between said conforming platen surfaces and the respectively associated endless bands, the improvement wherein at least a portion of a surface of said press platens is comprised of a PTFE composite comprising a layer of virgin PTFE that confronts a surface of an endless band and a layer comprising filled PTFE that is attached to the press platen, the layer of filled PTFE being partially compressed at a pressure less than about 14.7 psi and the layer of partially compressed filled PTFE and the layer of virgin PTFE being compressed together and sintered.

2. The press of claim 1, wherein the PTFE composite defines a pressure pad and wherein the press platens comprise carrier plates and a plurality of PTFE pressure pads disposed within the carrier plates.

3. The press of claim 1, wherein the layers of virgin PTFE and filled PTFE comprise a modified PTFE resin.

4. The press of claim 1, wherein the filled PTFE comprises a carbon filler.

5. The press of claim 4, wherein the carbon filler comprises about 10% to 30% by weight of the filled PTFE.

6. The press of claim 4, wherein the carbon filler comprises about 20% by weight of the filled PTFE.

7. The press of claim 1, wherein the layer of filled PTFE is about 0.5 inches thick.

8. The press of claim 1, wherein the layer of virgin PTFE is about 0.125 inches thick.

9. The press of claim 2, wherein the PTFE composite has angled sides.

10. A continuously operating press for pressing a web of material, the press having a press zone at an input side thereof and a calibration zone at an output side thereof and comprising:

a lower press platen with a surface and an upper press platen with a surface confronting said surface of said lower press platen, the lower press platen and the upper press platen each having a pressure pad comprising a PTFE composite that comprises a layer of virgin PTFE and a layer of filled PTFE, the layer of filled PTFE being partially compressed at a pressure less than about 14.7 psi and the layer of partially compressed filled PTFE and the layer of virgin PTFE being compressed together and sintered;

a first endless band guided around said lower platen; and a second endless band guided around said upper platen.

11. The press of claim 10, wherein the filled PTFE comprises a carbon filler.

12. The press of claim 11, wherein the carbon filler comprises about 10% to 30% by weight of the filled PTFE.

13. The press of claim 11, wherein the carbon filler comprises about 20% by weight of the filled PTFE.

14. The press of claim 10, wherein the layer of filled PTFE is about 0.5 inches thick.

15. The press of claim 10, wherein the layer of virgin PTFE is about 0.125 inches thick.

16. The press of claim 10, wherein the PTFE composite has angled sides.

17. The press of claim 10, further comprising a means for adjusting the relative positions of said press platens and for urging them towards each other.

18. The press of claim 10, further comprising a means for driving said first and second endless bands at the same speed throughout said press zone and said calibration zone.

19. The press of claim 10, further comprising an arrangement for building up and maintaining a film of lubricant between said platen surface and the respectively associated endless bands.

* * * * *